(12) United States Patent
Mathur et al.

(10) Patent No.: US 6,661,457 B1
(45) Date of Patent: Dec. 9, 2003

(54) PIXEL READ-OUT ARCHITECTURE

(75) Inventors: Bimal P. Mathur, Thousand Oaks, CA (US); H. Taichi Wang, Thousand Oaks, CA (US)

(73) Assignee: Biomorphic VLSI, Inc., Westlake Village, CA (US)

( * ) Notice: Subject to any disclaimer, the term of this patent is extended or adjusted under 35 U.S.C. 154(b) by 0 days.

(21) Appl. No.: 09/274,424

(22) Filed: Mar. 22, 1999

(51) Int. Cl.[7] .................................................. H04N 3/14
(52) U.S. Cl. ...................................................... 348/273
(58) Field of Search ................................ 348/272, 273, 348/274, 276, 277, 279, 280, 281, 282, 283, 308; 257/440

(56) References Cited

U.S. PATENT DOCUMENTS

| 4,768,084 A | * | 8/1988 | Noda et al. ............... 348/273 |
| 5,121,192 A | * | 6/1992 | Kazui ....................... 348/273 |
| 5,276,521 A | | 1/1994 | Mori |
| 5,471,515 A | | 11/1995 | Fossum et al. |
| 5,847,758 A | * | 12/1998 | Ilzuka ....................... 348/273 |
| 6,466,265 B1 | * | 10/2002 | Lee et al. ................... 348/308 |

FOREIGN PATENT DOCUMENTS

EP         0861005         8/1998

* cited by examiner

*Primary Examiner*—Wendy R. Garber
*Assistant Examiner*—Rashawn N Tillery
(74) *Attorney, Agent, or Firm*—Pillsbury Winthrop LLP

(57) ABSTRACT

A system and method for reading out pixel signals from a multi-color imaging array. The imaging array includes light-sensitive elements which are arranged in rows and columns. Each of the light-sensitive elements is sensitive to photon energy in one of a plurality of spectral regions or color bands. Read-out circuits extract signals representative of an intensity of the photo exposure of the light-sensitive elements at extraction intervals one row at a time. At any particular extraction interval, all of the signals extracted by a particular read-out circuit originate at light-sensitive elements which are sensitive to photon energy in the same spectral region or color band.

9 Claims, 9 Drawing Sheets

PIXEL READ-OUT ARCHITECTURE

BACKGROUND

1. Field of the Invention

The present invention relates to digital photography. In particular, the described embodiments relate to digital imaging arrays.

2. Related Art

Digital cameras have enabled the convenient transfer of still images to computer readable memory. A digital camera typically includes a lens which focuses light reflected from objects onto an electronic imaging array. An image exposure is then captured onto a computer readable memory, allowing for the convenient reproduction of the image by a color printer which may be part of a personal computer system.

The imaging array typically includes a plurality of pixels or light sensitive elements. By use of appropriate filters, the pixels are made sensitive to energy in particular color bands or spectral regions. For example, a typical imaging array has three sets of pixels, each pixel being sensitive to one of red light, blue light and green light. Such an array is described in detail in U.S. Pat. No. 3,971,065 to Bayer. These imaging arrays typically form a mosaic pattern which uniformly distributes each of the three sets of pixels over the array. The individual pixels in the array sense the intensity of light in specific spectral regions at specific locations in the imaging array. This enables the reconstruction of the image using techniques known to those of ordinary skill in the art.

Conventional imaging arrays comprise charge coupled devices (CCDs) to convert a pixel of light energy into charge. The charge is stored in a capacitor formed in the imaging array at the pixel location. The quantity of stored charge is proportional to the energy received at the pixel location over an exposure period. Additionally, imaging arrays have been constructed from active pixel sensor (APS) cells to convert light energy into an electric voltage at a photodiode. Circuitry for implementing APS cells is shown in U.S. Pat. Nos. 5,471,515 and 5,587,596. The APS cell imaging arrays can be integrated into a CMOS imaging chip, i.e., integrated circuit.

The circuitry for all of the pixels in an imaging array is typically uniform regardless of the color of the individual pixels. CCD and APS imaging arrays typically cannot identify the wavelength or color of light detected at a particular pixel based solely upon the electrical signal generated at the output of the pixel. Color selectivity is provided by controlling the color of light that is allowed to reach a photo detector. One typical method includes directly depositing transmission filters onto substrate areas where individual pixels are located. The filter color pattern deposited on a given pixel element in the imaging array controls the color of light that is detected by that particular pixel. Thus, while the optics produce an image which has the same color depth at each point of the image, the image incident on the imager collects only one color at each pixel location. If red, green and blue are used as the primary colors, a typical imaging array will have individual pixels with a red, green or blue filter deposited thereon. A typical system is described in detail in the aforementioned U.S. Pat. No. 3,971,065.

Digital cameras employ several methods for extracting the pixel data from the imaging array. For a CCD based array, the charge stored at the pixel locations in the array may be sequentially transferred to the capacitors of neighboring pixels, one pixel at a time, until the charge reaches a read-out circuit for quantizing the charge at an edge of the array. For example, in some systems, the charges stored at each pixel location may be simultaneously shifted in a direction toward the read-out circuitry.

For an APS based array, the voltages at the photodiodes may be coupled directly to the read-out circuit. The voltages for the individual pixels are typically readout one row at a time by applying a row selection signal to a row of pixels, while the read-out circuit receives the corresponding voltages from each pixel in the row.

Existing read-out circuitry generates mixed color data. Readout techniques for extracting data from an imaging array having a Bayer pattern typically provide mixed color data in which blue pixel data is interleaved with green pixel data, and red pixel data is interleaved with green pixel data. The mixed color data is typically stored in a memory to be processed later in a digital image processor. Certain image processing techniques require color processing which utilizes algorithms applied to all pixels of a particular color. This requires sorting of the mixed color data stored in the memory. This increases processing requirements at the image processor which contributes to increased cost, power consumption and weight of a digital camera. Therefore, there is a need for facilitating color extraction which reduces the requirements for processing at a digital image processor.

SUMMARY

An object of an embodiment of the present invention is to provide an architecture for the efficient extraction of data from photo sensors.

Another object of an embodiment of the present invention is to provide a system and method for extracting data from photo sensors which reduces processor and memory requirements for digital cameras.

It is another object of an embodiment of the present invention to provide a system and method for simplifying color processing in digital cameras.

It is another object of an embodiment of the present invention to reduce the cost, weight and power consumption of digital cameras.

It is yet another object of an embodiment of the present invention to provide a system and method for grouping information extracted from pixels on an imaging array by color.

Briefly, an embodiment of the present invention is directed to a system for extracting data from an array of light-sensitive elements. Each of the light-sensitive elements is sensitive to energy in one of a plurality of spectral regions. An extraction circuit extracts data representative of the intensity of photo-exposure of each of a plurality of the light-sensitive elements in extraction intervals. The data extracted in each extraction interval at the extraction circuit originates from light-sensitive elements associated with a common spectral region (e.g., red).

Accordingly, all signals extracted at the extraction circuit in any particular extraction interval are representative of photo-exposures of the light-sensitive elements which are sensitive to energy in the same common spectral region. This enables uniform color processing on data read out from the extraction circuit following an extraction interval. This reduces the requirements for digital processing which in turn reduces manufacturing costs, weight and power consumption of a digital camera.

DETAILED DESCRIPTION

Embodiments of the present invention are directed to a system and method for extracting color information from a photo energized imaging array having multicolored pixels. A read-out architecture allows for the collection of image data for each color separately. Sub-images for each color may then be constructed without an intermediate step of sorting mixed color data stored in a memory. These subimages may then be processed by pipelined signal processing circuitry to reduce the processing requirements of central processing hardware of a digital camera.

Figure 1:
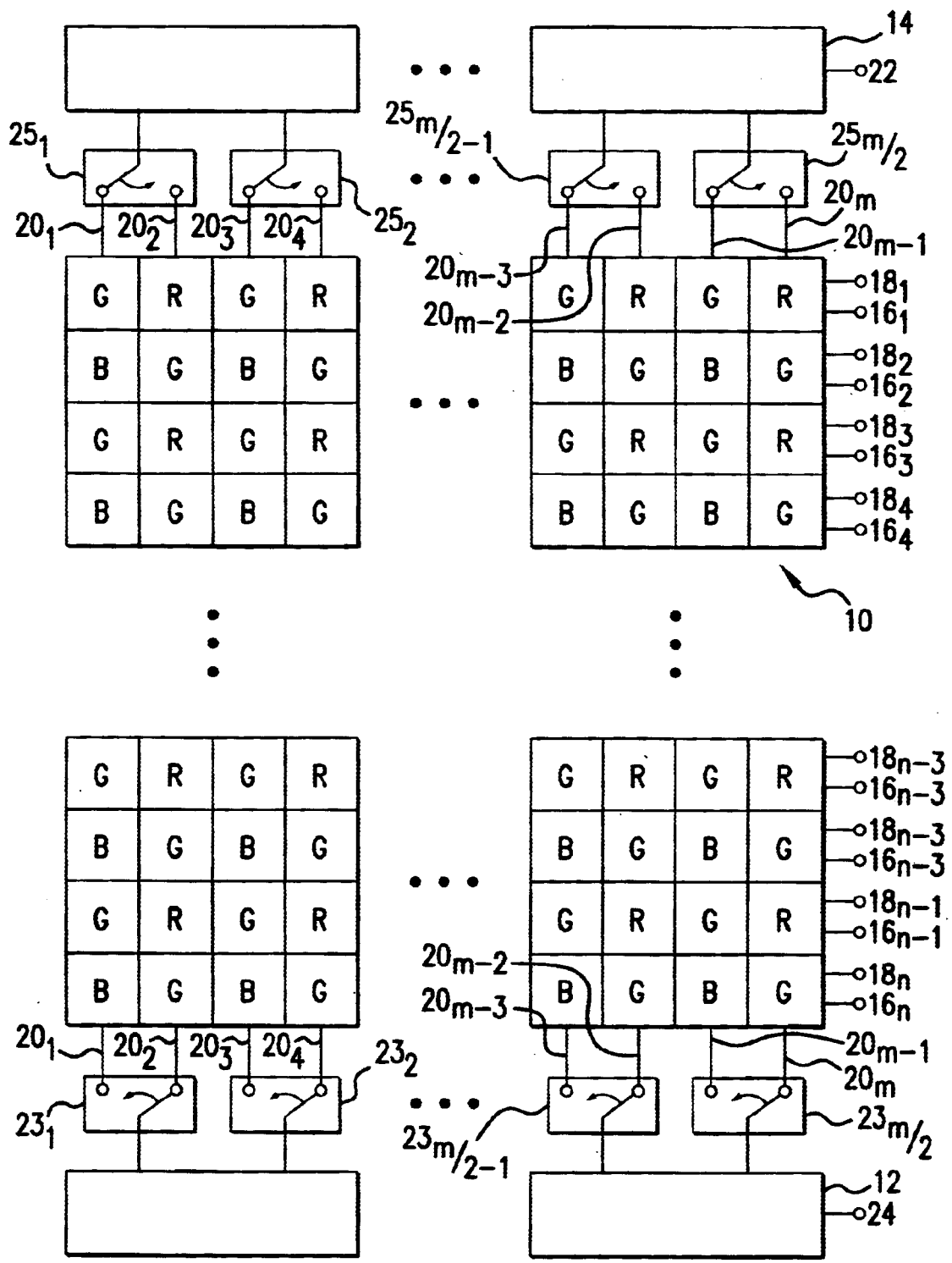
FIG. 1 shows an imaging array with related read-out circuitry according to an embodiment of the present invention.

FIG. 1 illustrates an embodiment of the present invention which includes an imaging array 10 and scanning readout circuits 12 and 14 for extracting data which is representative of the intensity of photo exposure of individual pixels in the array 10 over an exposure period. The imaging array 10 is an m by n array of light sensitive elements or pixels which are sensitive to energy in a spectral region. The embodiment of FIG. 1 includes pixels which are sensitive to energy in spectral regions for red, green and blue light as indicated by the letters R, G and B, respectively. According to an embodiment, the array 10 has 1,024 columns and 768 rows, complying with the XGA standard of 1,024 columns by 768 rows. The array 10 may include additional rows and columns of pixels to minimize edge effects. However, embodiments of the present invention are not limited to any specific size or dimension of array. FIG. 1 illustrates an embodiment in which the arrangement of color pixels are in a Bayer pattern as disclosed in U.S. Pat. No. 3,971,065. However, embodiments of the present invention are also applicable to other color patterns in an imaging array.

According to an embodiment, the imaging array 10 is exposed to light emitting from an object for a brief period of time. In an embodiment in which the array 10 is installed in a digital camera, this may take the form of opening and closing a physical shutter to allow focused light passing through a lens to impinge upon the individual pixels of the array 10 for an exposure period such as 30 to 35 msec. Following exposure, signals representative of the energy collected from the exposure of the individual pixels in the array are read out from the imaging array 10, one row at a time. These signals are readout from a particular row by applying a voltage to a row select line 16 corresponding with the row. As shown in FIG. 1, each of the rows 1 through n have an associated row select line $16_1$–$16_n$. Upon selection of a row select line 16 for a particular row, the scanning circuits 12 and 14 extract signals representative of the intensity of photo exposure of each of the pixels in the row at column sense lines 20. As shown in FIG. 1, there are an m number of column sense lines 20, one for each column.

Scanning readout circuits 12 and 14 have associated switches 25 and 23 coupled to the column sense lines 20. The scanning readout circuits 12 and 14 sample intensity values from each row in the array 10 at extraction intervals one row at a time. According to an embodiment, the switches 25 and 23 alternate from coupling to the column sense lines 20 of adjacent columns. In this manner, in each extraction interval, all of the intensity values extracted at a particular scanning readout circuit 12 or 14 originate from pixels of the same color or spectral region. At any extraction interval, each of the switches 25 and 23 are coupled to either an even or odd column sense line 20. If the switches 25 are coupled to the odd column sense lines 20 in an extraction interval, for example, the switches 23 are coupled to the even column sense lines 20. Likewise, if the switches 25 are coupled to the column sense lines 20 of odd columns, the switches 23 are coupled to the column sense lines 20 of even columns.

As an example, consider the extraction of intensity values at rows 1 through 4 in successive extraction intervals. In the first extraction interval, row select line $16_1$ is enabled so that signals representative of the intensity of the photo exposure of the pixels in row 1 are provided to the column sense lines 20. The switches 25 are positioned to couple to the odd column sense lines (i.e., column sense lines $20_1$, $20_3$, . . . ) to circuit 14, and the switches 23 are positioned to couple the even column sense lines (i.e., column sense lines $20_2$, $20_4$, . . . ) to circuit 12. Here, the scanning circuit 14 collects the intensity values of all of the green pixels, and the scanning circuit 12 collects all of the red pixels in row 1. In a subsequent extraction cycle, row select line $16_2$ is enabled and the switches 25 couple the scanning readout circuit 14 to the column sense lines 20 of the even columns, and the switches 23 couple the scanning readout circuit 12 to the column sense lines 20 of the odd columns. Here, the intensity values for all green pixels in row 2 are extracted at the scanning circuit 14, and the intensity values for all blue pixels in row 2 are extracted at the scanning circuit 12. For the extraction cycle at row 3, row select line $16_3$ is enabled and the switches 25 couple the scanning readout circuit 14 to the column sense lines 20 of odd columns, and the switches 23 couple the scanning readout circuit 12 to the column sense lines 20 of even columns. The scanning circuit 14 extracts the intensity values of all of the green pixels in row 3. Similarly, the scanning circuit 12 extracts the intensity values of all of the red pixels in row 3. For the fourth row, row select line $16_4$ is enabled and the switches 25 couple the scanning readout circuit 14 to the column sense lines 20 of the even columns, and the switches 23 couple the scanning readout circuit 12 to the column sense lines 20 of the odd columns. Here, the scanning circuit 14 extracts the intensity values for each of the green pixels in row 4 and the scanning circuit 12 extracts the intensity values for all of the blue pixels in row 4.

This switching sequence is repeated until the intensity of photo exposure of each of the n rows is extracted at either the scanning circuit 12 or the scanning circuit 14. By alternating the positions of switches 23 and 25 in a complementary, alternating fashion as discussed above, in any particular scanning interval all of the intensity values extracted at a particular scanning circuit 12 or 14 are of the same color or spectral region. For a Bayer-patterned array, the scanning circuit 14 extracts intensity values for each of the green pixels in a row during each extraction cycle. For the illustrated array, the scanning circuit 12 extracts intensity values for all of either the red or blue pixels in a selected row during each extraction cycle. During any particular extraction cycle, the scanning circuit 12 extracts intensity values corresponding to only one of the red and blue colors. During the extraction of rows 1 and 3 as discussed above, the scanning circuit 12 extracts the intensity values for only red pixels during those extraction intervals. Similarly, during the extraction of rows 2 and 4, the scanning circuit 12 extracts only intensity values corresponding to blue pixels. This sequence continues throughout the extraction of the intensity values from the rows 1 through n. At every extraction interval, the scanning circuit 14 will extract intensity values only from green pixels. The scanning circuit 12 only extracts intensity values only of either red pixels or blue pixels, depending upon whether the extracted row is odd or even. Thus, the architecture of the present embodiment permits the separation of color data upon extraction at the scanning circuits 12 and 14.

Figure 2:
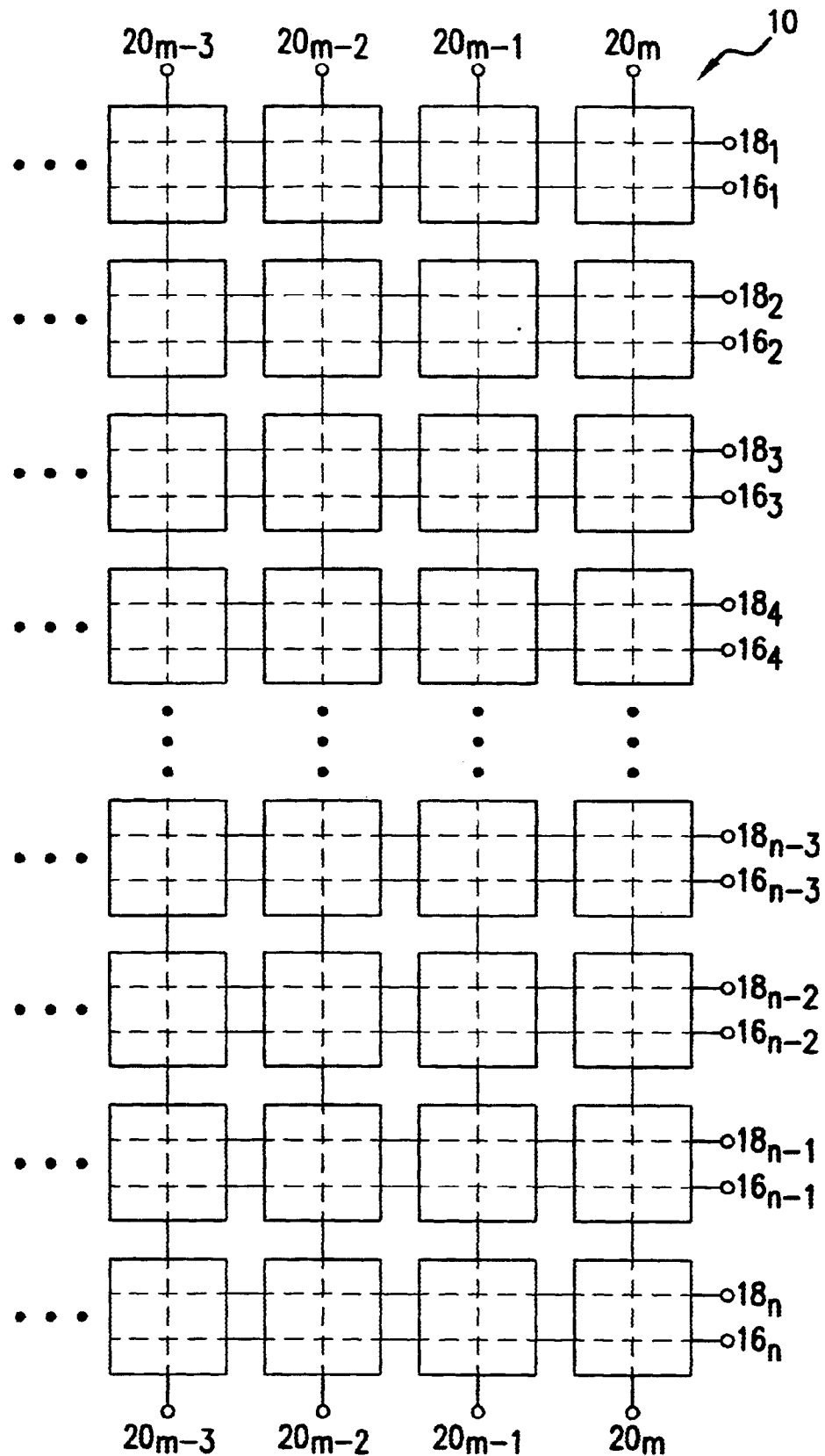
FIG. 2 shows an embodiment of the imaging array of FIG. 1 in which all light-sensitive elements in each column have a common column sense line, and all light-sensitive elements in each row have a common row select line and a common reset line.

FIG. 2 illustrates an embodiment of the imaging array 10 in which each of the column sense lines 20 is coupled continuously through each pixel in its respective column. Similarly, FIG. 2 shows that each of the row select lines is coupled to each of the pixels in the respective row. FIGS. 1 and 2 also show reset lines $18_1$ through $18_n$, each corresponding to an associated row in the imaging array 10. The reset lines 18 are enabled following extraction intervals to reset the pixel elements as described with reference to FIG. 3.

Figure 3:
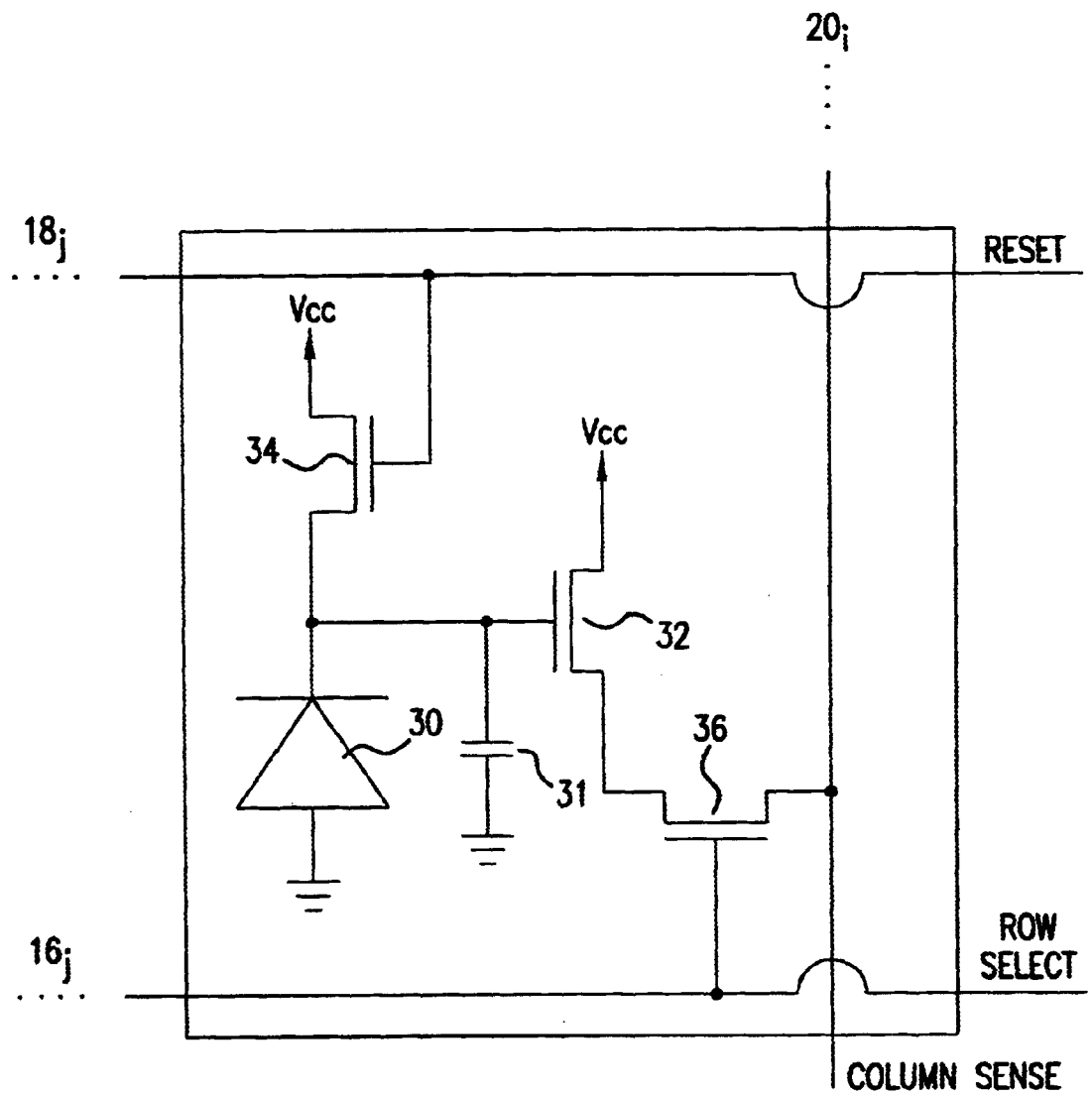
FIG. 3 shows an embodiment of the circuitry which may be formed in the substrate in the location of a light-sensitive element of the imaging array of FIG. 1.

FIG. 3 illustrates exemplary circuitry for an individual light-sensitive element in the embodiment shown in FIGS. 1 and 2. In particular, FIG. 3 shows circuitry for a pixel in a CMOS active pixel sensor (APS) array according to an embodiment of the imaging array 10. A photodiode 30 (having a parasitic capacitance) and capacitor 31 accumulate photon generated charge during the exposure period. Prior to exposure, the reset line 18 is enabled to momentarily close a transistor switch 34. When the transistor switch 34 is closed, the photodiode 30 is reverse biased at an initial voltage. During the exposure period, electrons accumulate at the photodiode 30 and capacitor 31 in proportion to photon flux incident on the photodiode, raising the potential above the reset voltage. This voltage is applied to the gate of a sense transistor 32. Thus, when the row select line 16 is enabled, closing the transistor switch 36, the transistor 32 provides an amplified signal to the column sense line 20 which is representative of the photon flux collected at the photodiode 30 and capacitor 31 during the exposure period. Similar circuits are described in the aforementioned U.S. Pat. Nos. 5,471,515 and 5,587,596.

FIG. 3 shows that the photodiode 30 and the capacitor 31 as distinct components. Thus, photon charge is accumulated at the parasitic capacitance of the photodiode 30 and the capacitance of the capacitor 31. In other embodiments, the photon charge may be accumulated only at the parasitic capacitance of the photodiode 30, eliminating the requirement for forming an additional capacitor in parallel with the photodiode 30.

Figure 4A:
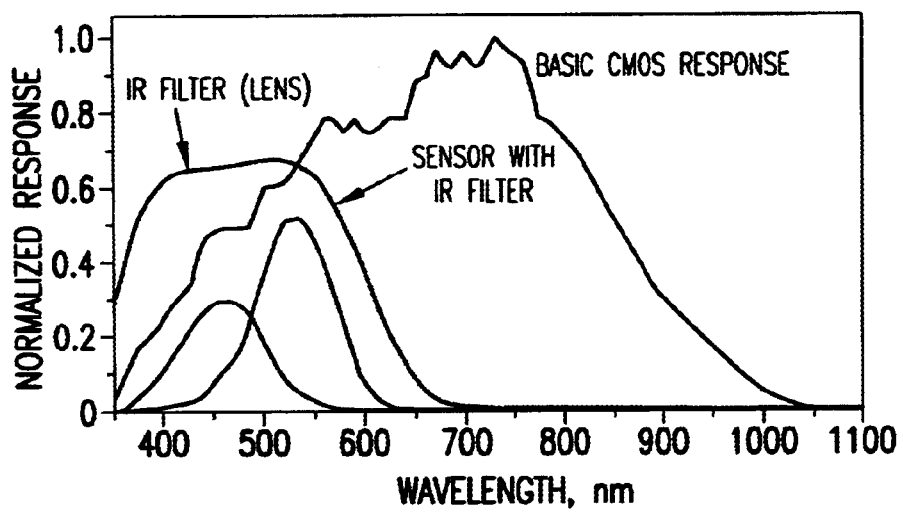
FIGS. 4a and 4b show plots of the absorption characteristics in pixel regions of the imaging array of FIG. 1 according to an embodiment.
Figure 4B:
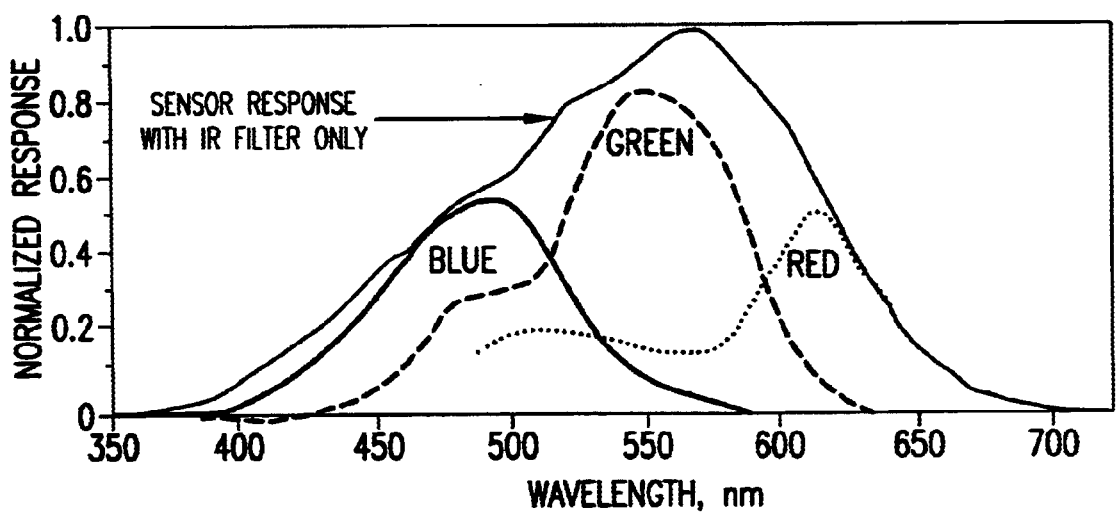

FIGS. 4a and 4b show plots of the absorption characteristics of the blue, red, and green pixels in the imaging array 10 according to an embodiment with selected red, blue and green transmissive filters deposited over the photodiodes 30 illustrated in FIG. 3. Each pixel has an associated photodiode basic CMOS characteristic response to unfiltered light. In preferred embodiments, the imaging array 10 is disposed within a camera (not shown) having a lens (not shown) for focusing light onto the imaging array 10. As illustrated in FIG. 4a, the lens acts to low-pass filter the impinging light, limiting the pixel responses to only photon energy in the low-pass spectral region.

FIG. 4b shows a detailed plot of the absorption characteristics at pixel locations having red, green and blue transmissive filters. As discussed above with reference to FIG. 3, a photodiode at each pixel outputs a voltage representative of the photon energy collected at the photodiode over an exposure period. This voltage is preferably representative of an integration of the photon energy (attenuated according to the characteristics in the associated profile of FIG. 4b) collected over the exposure period. FIG. 4b illustrates that the green pixels are the most responsive to photon energy in the visible spectrum (i.e., photon energy having wavelengths between 400 and 700 nm). As discussed below, the outputs of the pixels are preferably adjusted to normalize output voltages to account for the different levels of response from different colored pixels.

Figure 5A:
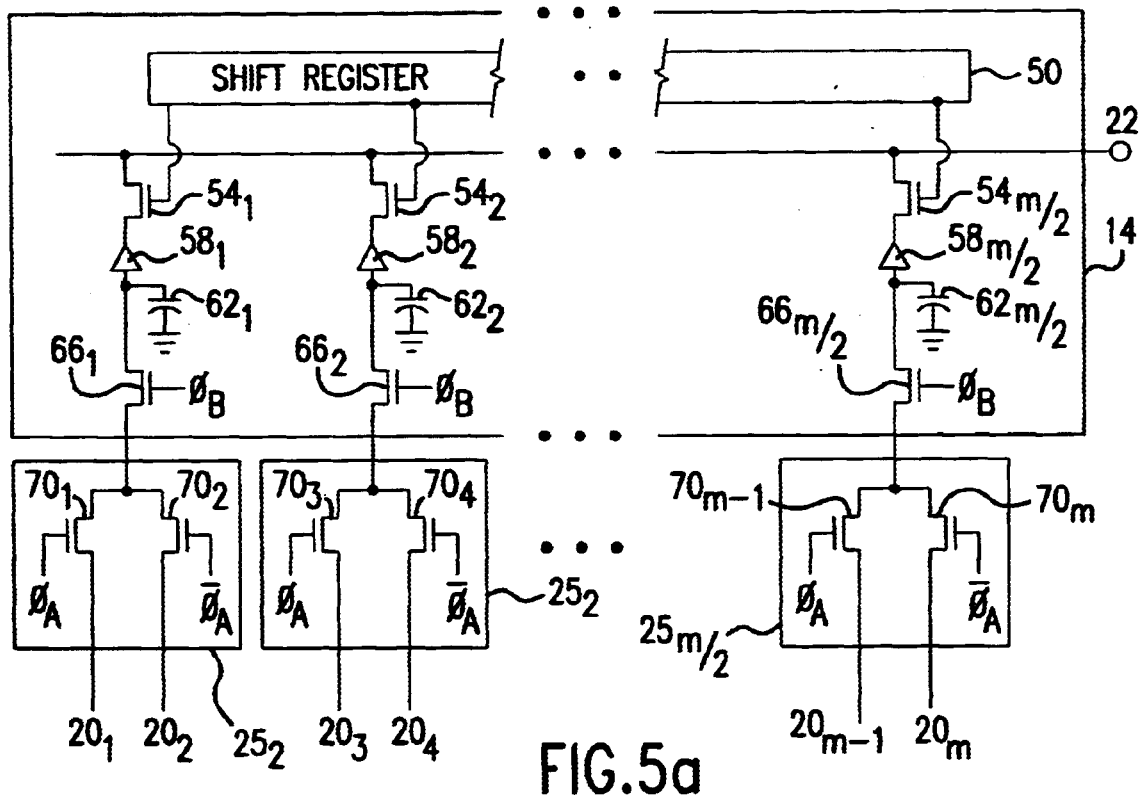
FIGS. 5a and 5b show a first embodiment of the scanning readout circuits in the embodiment of FIG. 1.
Figure 5B:
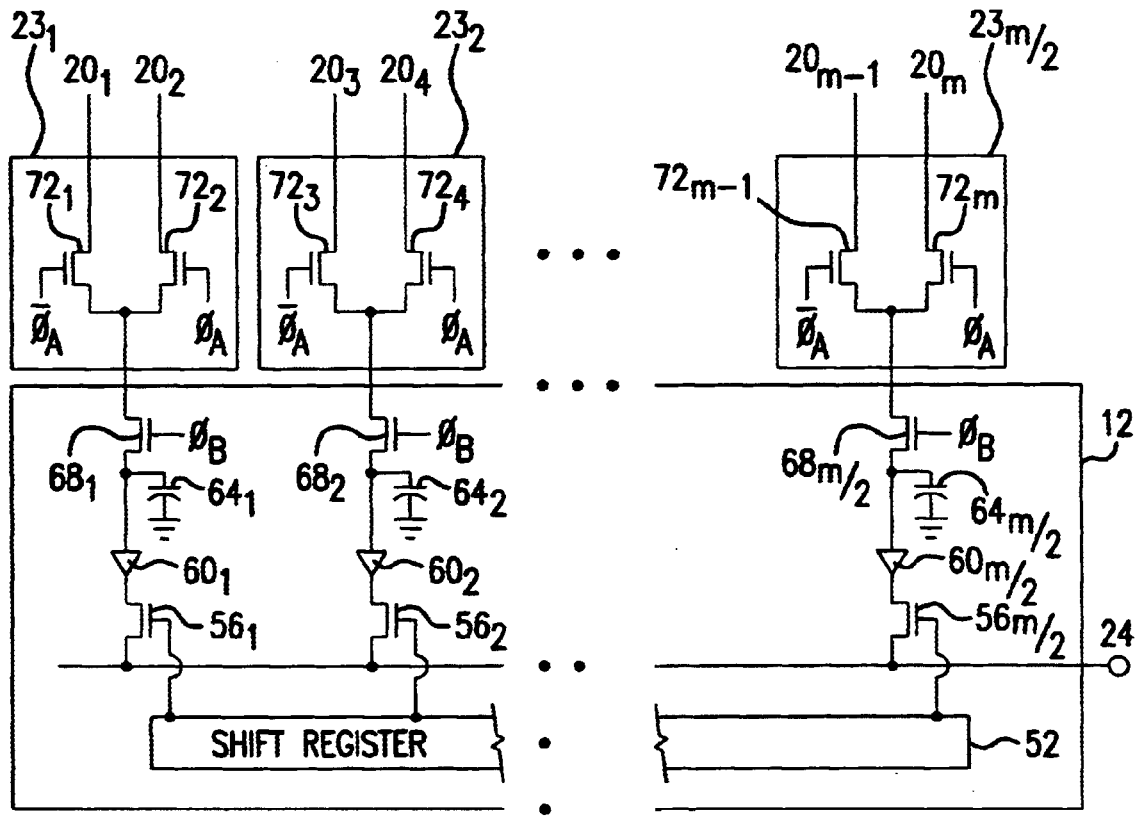

FIGS. 5b and 5a show an embodiment of the scanning readout circuits 12 and 14 of the embodiment shown in FIG. 1. Switches 23 and 25 receive each of the column sense lines $20_1$ through $20_m$. Referring to FIG. 2, each scanning interval, a voltage is applied to a selected one of the row select lines 16 at a corresponding row. This applies the voltages at each of the photodiodes 30 in the selected row to a corresponding column sense line 20.

Returning to FIGS. 5a and 5b, each of the column sense lines $20_1$ through $20_m$ are received at a corresponding switch transistor 70 at the switches 25, and at a switch transistor 72 at the switches 23. The switch transistors 70 and 72 are switched on or off by the signal $\phi_A$ and its complement signal $\bar{\phi}_A$. As discussed above with reference to FIG. 1, during any particular scanning interval, the scanning readout circuits 12 and 14 each extract voltage information from photodiodes in the same row in the imaging array 10.

While the scanning readout circuit 12 is receiving image data from odd column sense lines 20 (i.e., column sense lines $20_1$, $20_3$, etc.), the scanning readout circuit 14 is receiving image data from the even column sense lines 20 (i.e., column lines $20_2$, $20_4$, etc.). In such an interval, when the scanning readout circuit 12 is to read values from the odd column sense lines 20 and the scanning readout circuit 14 is to read values from the even column sense lines 20, the value of $\bar{\phi}_A$ is high to turn on the switch transistors $70_2$, $70_4$, etc. (corresponding to the even column sense lines 20) and to turn on the switch transistors $72_1$, $72_3$, etc. (corresponding to the odd column sense lines 20). Meanwhile, the value of $\phi_A$ is low to turn off the switch transistors $70_1$, $70_3$, etc. (to decouple the odd column sense lines 20 from the scanning readout circuit 14) and to turn off the switch transistors $72_2$, $72_4$, etc. (to decouple the even column sense lines 20 from the scanning readout circuit 12).

In a subsequent scanning interval, $\phi_A$ is high and $\bar{\phi}_A$ is low. This enables select switch transistors $70_1$, $70_3$, etc. to couple the odd column sense lines 20 to the scanning readout circuit 14 and enables transistors $72_2$, $72_4$, etc. to couple the even column sense lines 20 to the scanning readout circuit 12. Since $\overline{\phi}_A$ is low, the switch transistors $70_2$, $70_4$, etc. corresponding to the even column sense lines 20 are turned off (to decouple the even column sense lines 20 from the scanning readout circuit 14), and the switch transistors $72_1$, $72_3$, etc. corresponding to the odd column sense lines are turned off (to decouple the odd column sense lines 20 from the scanning readout circuit 12).

A transistor 66 and corresponding capacitor 62 form a sample and hold circuit in the scanning readout circuit 14. Similarly, each transistor 68 and corresponding capacitor 64 form a sample and hold circuit at the scanning readout circuit 12. At each scanning interval, the signal $\phi_B$ is enabled for an appropriate sampling interval to turn on transistors $66_1$ through $66_{m/2}$ and turn on the transistors $68_1$ through $68_{m/2}$. This causes a sampling of the voltage at the corresponding photodiode 30 (FIG. 3) for storage at either a corresponding capacitor 62 at the scanning readout circuit 14 or corresponding capacitor 64 at the scanning readout circuit 12, depending on where the photodiode is located within the selected row.

Scanning readout circuits 12 and 14 include shift registers 50 and 52. Shift registers 50 and 52 preferably have a length of m/2 and an output at each location. The shift registers 50 and 52 are preferably loaded with a single "1" at one location, and loaded with "0s" at the remaining locations. During each scanning interval following the assertion of the $\phi_B$ signal to sample the voltage at the photodiodes, the single "1" in the shift register 50 is shifted sequentially to all locations and provided as an output to the gate of a corresponding transistor 54, applying a high signal to the gate to turn on transistor 54. When a switch transistor 54 is turned on, the voltage stored at the corresponding capacitor 62 is coupled to the output line 22 through a buffer amplifier 58. The buffer amplifier 58 preferably provides sufficient output impedance to the output bus 22 to quickly drive the output bus through downstream processing described below with reference to FIG. 6. A similar function is performed in the scanning readout circuit 12 in which a single "1" in the shift register 52 is sequentially shifted through the length of the shift register 52 once following the assertion of the $\phi_B$ signal to apply the voltages stored at the capacitors 64 to the output bus 24.

Figure 6:
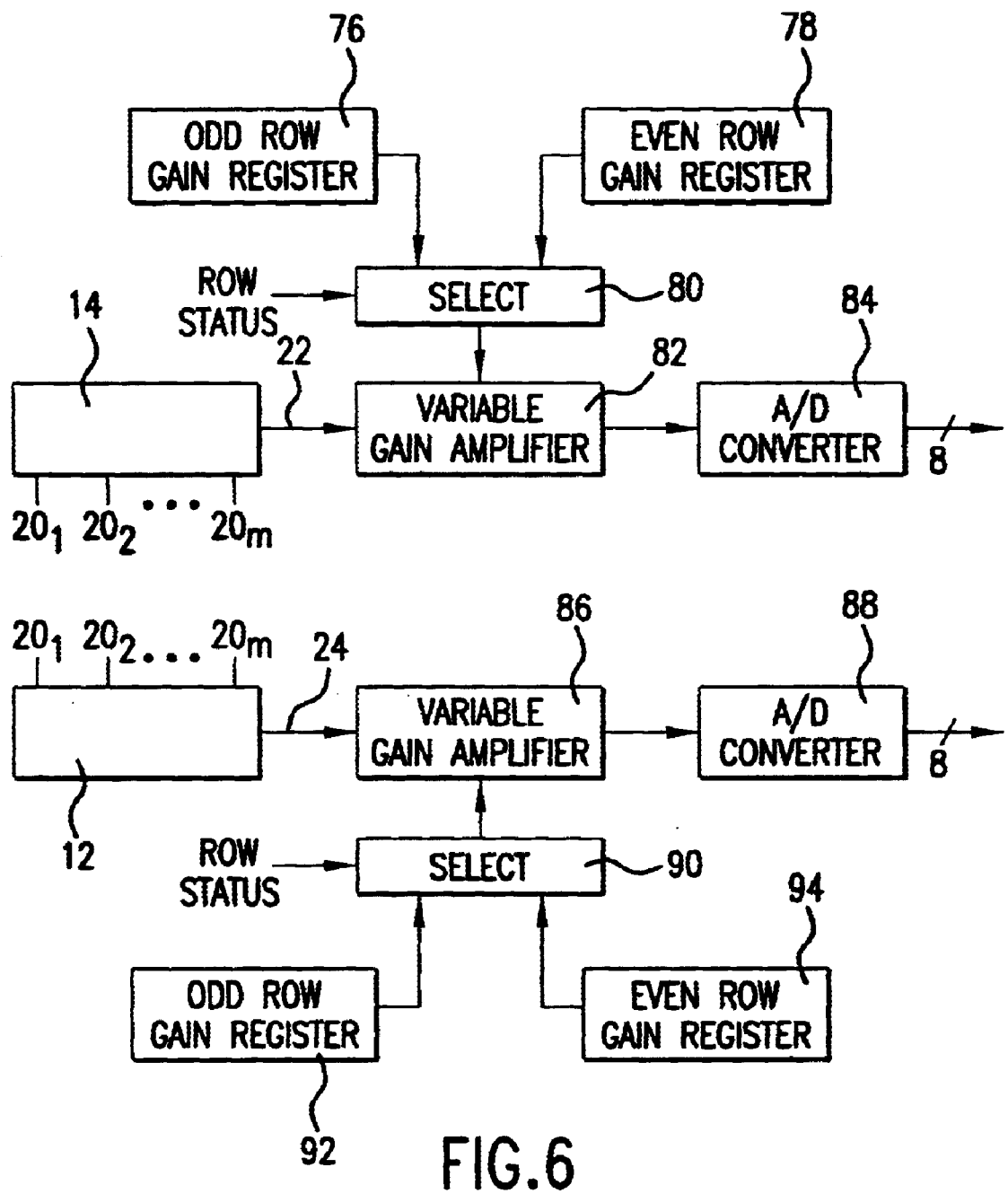
FIG. 6 shows a schematic diagram illustrating an embodiment of downstream processing of the output signals of the scanning readout circuits shown in FIGS. 5a and 5b.

FIG. 6 is a block diagram illustrating an embodiment which is used to process signals from the output bus 22 of the scanning readout circuit 14, and signals from the output bus 24 of the scanning readout circuit 12. These signals are processed to provide binary values which are representative of the photon energy collected by the photodiodes 30 during exposure. When the voltage at a capacitor 62 in the scanning readout circuit 14 is coupled to the output bus 22 through a corresponding switch transistor 54, a variable gain amplifier 82 applies a gain to the signal which is then digitized at an analog-to-digital converter 84. As discussed above, in preferred embodiments, all of the output values applied to the output bus 22 during any particular scanning interval are all representative of an intensity of photo exposure on pixels of the same color. For example, referring to the discussion above with reference to FIG. 1, the output values on the output bus 24 may be all red pixel output values or all blue pixel output values during alternating scanning intervals (or, green pixel output values during every scanning interval).

When the scanning readout circuit 12 is outputting all red pixel values on odd scanning intervals and all blue pixel values on the remaining even scanning intervals, a selection circuit 90 can load the contents of an odd row gain register 92 to the variable gain amplifier 86 to program the variable gain amplifier 86 to apply an appropriate gain uniformly to all output values of red pixels. For the even rows, the selection circuit 90 may then load contents of an even row gain register 94 to the variable gain amplifier 86 to uniformly apply a gain to output values of blue pixels. Thus, the selection circuit 90 will control the variable gain amplifier 86 to provide two different gains at alternating intervals, each gain to be applied to intensity values of a corresponding color.

This feature can be useful in, for example, normalizing the intensity of output values of different colored pixels which may be biased due to the non-uniform physical sensor response characteristics as shown in FIG. 4b. For example, FIG. 4b shows that the sensor response at red pixels is not as high as the sensor response at the blue or green pixels. Thus, for output values from red pixels, the variable gain amplifier 86 may provide a higher gain than to the output values from the blue pixels in the alternating scanning intervals. An even smaller gain may be applied by a variable gain amplifier 82 to the output values on output bus 24 from green pixels.

In the embodiment in which the scanning readout circuit 14 only outputs intensity values from green pixels, the value stored in the odd row gain registered 76 and even row gain register 78 are the same so that the selection circuit 80 will program the variable gain amplifier 82 to apply uniform gain to all of the green pixel values outputted at the output bus 24. The digitized values outputted from the analog digital converters 84 and 88 may then be used to create sub-images having either all red, all blue or all green pixel values which are uniformly normalized by the variable gain amplifiers 82 and 86.

Figure 7:
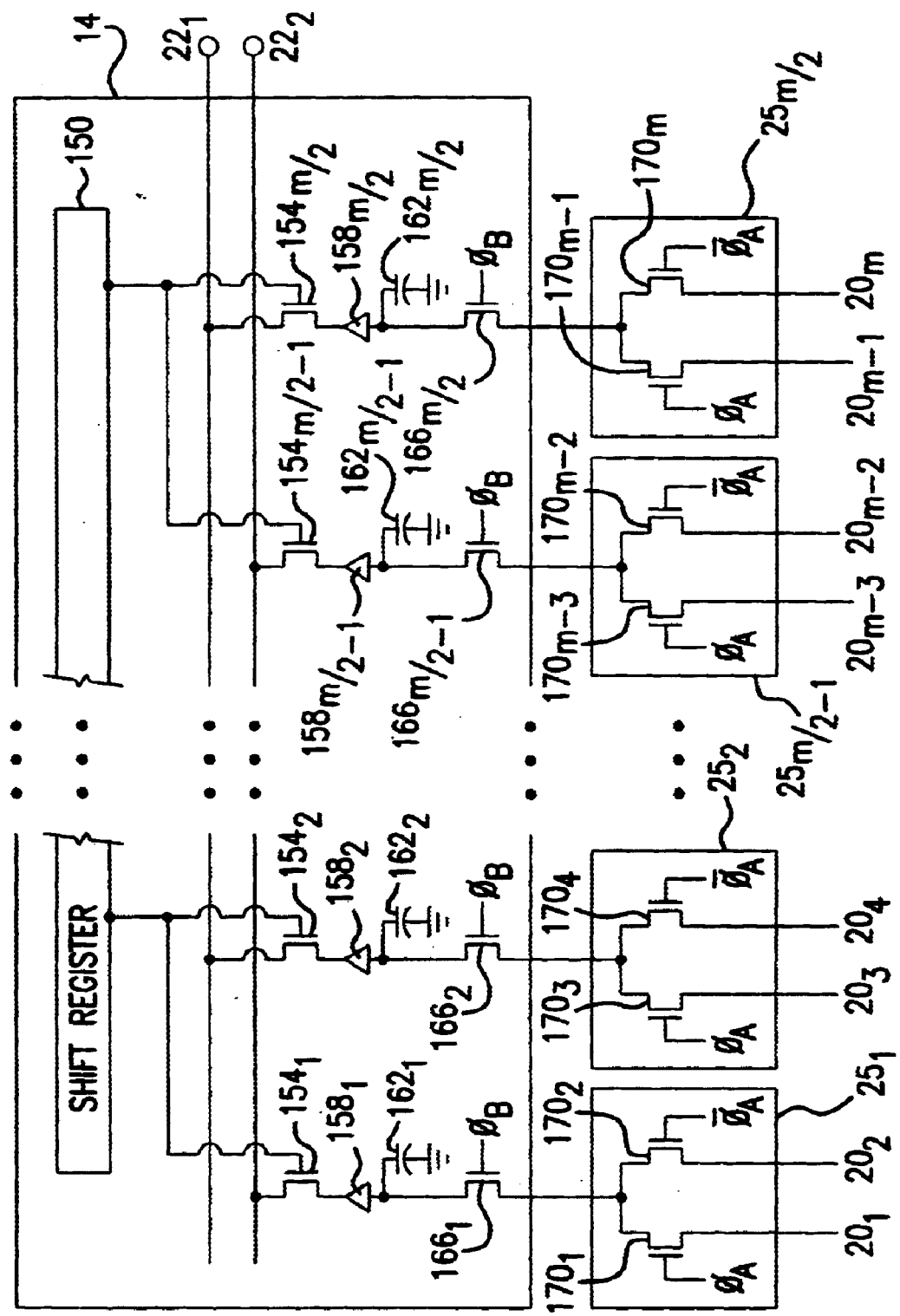
FIG. 7 illustrates a second embodiment of a scanning readout circuit in the embodiment of FIG. 1.
Figure 8:
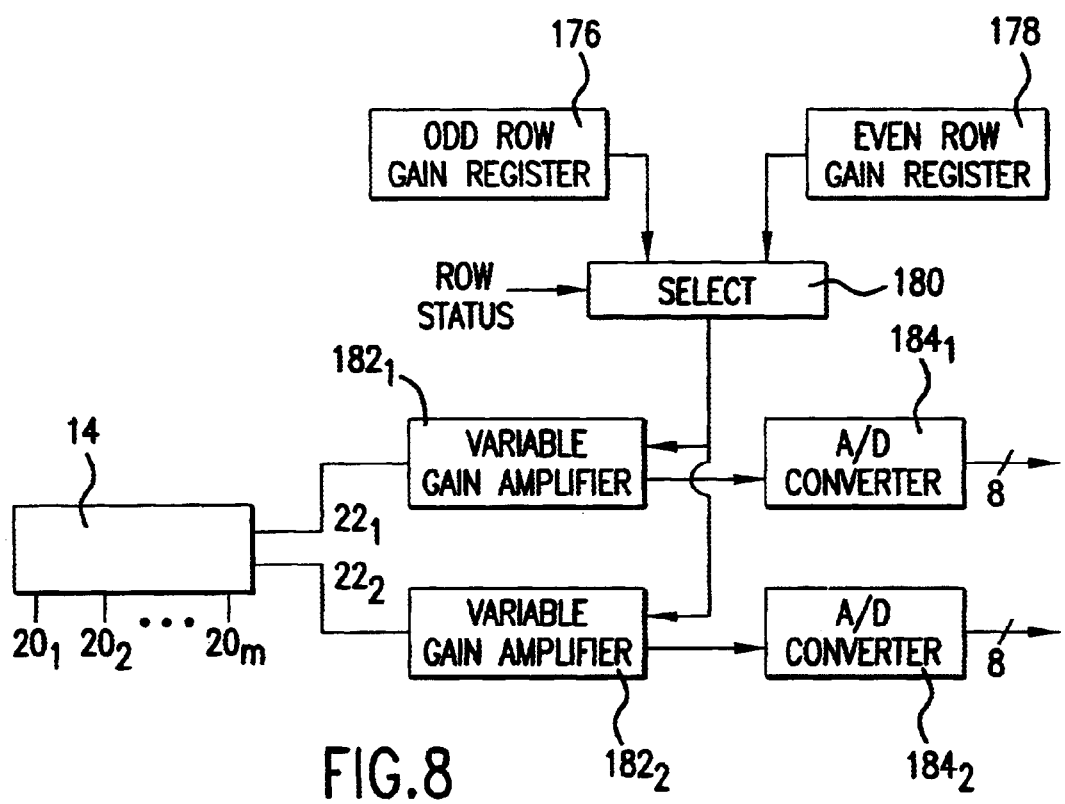
FIG. 8 shows a schematic diagram illustrating an embodiment of downstream processing of the output signals of the scanning readout circuit shown in FIG. 7.

FIGS. 7 and 8 illustrate an embodiment of the scanning readout circuit 14 and accompanying downstream processing in which output values are provided to two different output buses $22_1$ and $22_2$. This embodiment also preferably includes similar circuitry for the scanning readout circuit 12 and its accompanying downstream processing (not shown). It will be understood by those of ordinary skill in the art that the principles of FIGS. 7 and 8 readily apply to the scanning readout circuit 12 and its accompanying downstream processing.

Here, a single "1" is sequentially shifted through a shift register 150 following an assertion of the $\phi_B$ signal to switch on switch transistors 154, applying voltage values stored in the capacitors 162 to the output bus lines $22_1$ and $22_2$. At each position in the shift register 150, the single "1" applies a high signal to the gates of two different switch transistors 154. This will simultaneously apply output voltages to each of the output bus lines $22_1$ and $22_2$. By reading out pixel values at two different output bus lines $22_1$ and $22_2$, the voltages at the individual photodiodes 30 in the imaging array 10 can be read out faster. This may be advantageous in situations where there is significant leakage at the photodiodes 30, causing an offset in the voltages sampled at each of the photodiodes 30 based upon whether the voltage at the photodiode 30 is sampled at an earlier or later scanning interval.

FIG. 8 illustrates the processing of the voltages provided at the output lines $22_1$ and $22_2$ in the embodiment of FIG. 7. Selection circuit 180 preferably loads the same value from either odd row gain register 176 or even row gain register 178 to each of the variable gain amplifiers $182_1$ and $182_2$. Corresponding analog-to-digital converters $184_1$ and $184_2$ process the outputs of variable gain amplifiers $182_1$ and $182_2$ to provide digital representations of pixel intensity values.

The selection circuit 180 alternates loading the contents of the odd row gain register 176 and the even row gain register 178 into the variable gain amplifiers 182₁ and 182₂ to apply uniform gains to voltages representative of the intensity of photo exposure on pixels of the same color, as discussed above with reference to FIG. 6.

Figure 9:
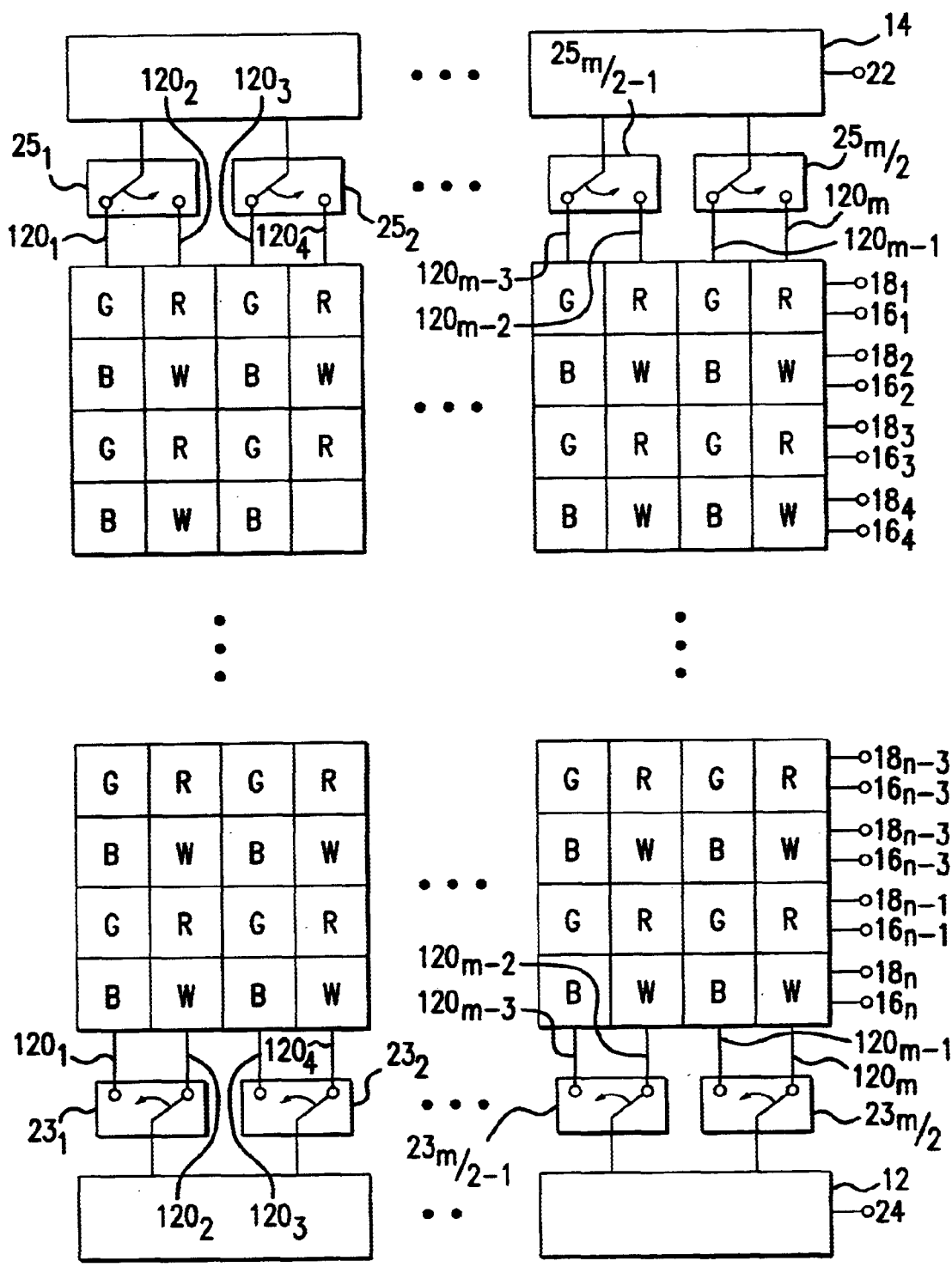
FIG. 9 shows an embodiment of the present invention in which the imaging array includes light-sensitive elements which are sensitive the light in four spectral regions.

FIG. 9 shows an embodiment in which the scanning readout circuits 14 and 12 are coupled to an imaging array 110 which includes pixels of four different colors: green, red, blue and white (labeled with the letters G, R, B and W), which are formed on a semiconductor substrate. As in the imaging array 10 shown in FIGS. 1 through 3, the red, green and blue pixels of the imaging array 110 are formed by depositing transmissive filters on the semiconductor substrate over the photodiode regions. The white pixels are formed by having an absence of any transmissive filter deposited over the semiconductor substrate over the corresponding photodiode region. This is described in detail in U.S. patent application Ser. No. 09/274,413, filed concurrently, for "Color Filter Pattern for Imaging Array", assigned to Biomorphic VLSI, Inc., the disclosure of which is incorporated by reference herein.

In a manner similar to that discussed above with reference to FIGS. 1–3, at the scanning intervals, each of the scanning circuits 12 and 14 will extract values representative of the intensity of photo exposure over pixels of all the same color. For example, in the example discussed above, the scanning readout circuit 12 extracts intensity values of either red pixels or blue pixels, depending upon whether the extracted row is odd or even. Rather than extracting intensity values from only green pixels at the scanning readout circuit 14 as in the previous example, in the embodiment of FIG. 9, the scanning readout circuit 14 reads out intensity values of green pixels or white pixels, depending upon which row in the imaging array 110 is being selected. The variable gain amplifiers 82 and 86 (FIG. 6) in the down stream processing may then apply a uniform set gain to each intensity value of the same color pixels.

For intensity values extracted at the extraction readout circuit 14 during an extraction interval for an odd row, all originating at green pixels, the variable gain amplifier 82 applies a gain based upon the contents of the odd row gain register 76. For intensity values extracted at the scanning readout circuit 14 during an extraction interval for an even row, all originating at white pixels, the variable gain amplifier 82 applies a gain based upon the contents of the even row gain register. Since the sensor response for the unfiltered white pixels is significantly greater than the sensor response for the green pixels (FIG. 4b), the gain uniformly applied to the intensity values originating at the white pixels during the even row extraction intervals is preferably lower than the gains uniformly applied to the intensity values originating at the green pixels during the odd row extraction intervals.

The embodiments discussed above provide a pixel readout architecture which allows downstream processing to apply a uniform set gain to all of the extracted intensity values to pixels of the same color. This permits the construction of sub-images comprising color information which is pre-processed, reducing the processing requirements of downstream image processing hardware in a digital camera.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of extracting data representative of photo-exposure intensity from light-sensitive elements in an array of light-sensitive elements, the array having distinct first and second sets of rows of the light-sensitive elements, each of the light-sensitive elements having a sensitivity to energy in-one of a plurality of spectral regions and being associated with a corresponding spectral region, each row having light-sensitive elements which are associated with at least two spectral regions, the method comprising:

at a first scanning circuit,
from each row in the first set of rows, extracting signals which are representative of an intensity of photo-exposure of light-sensitive elements associated with a first spectral region; and
from each row in the second set of rows, extracting signals which are representative of an intensity of photo-exposure of light-sensitive elements associated with a second spectral region which is distinct from the first spectral region; and at a second scanning circuit,
from each row in the first set of rows, extracting signals which are representative of an intensity of photo-exposure of light-sensitive elements associated with a third spectral region which is distinct from the first and second spectral regions; and
from each row in the second set of rows, extracting signals which are representative of an intensity of photo-exposure of light-sensitive elements associated with a fourth spectral region which is distinct from the first, second, and third spectral regions, wherein the signals representative of the intensity photo-exposure of each light-sensitive element associated with the first and second spectral regions is extracted at the first scanning circuit and the signals representative of the intensity of photo-exposure of each light-sensitive element associated with the third spectral region and the fourth spectral region are extracted at the second scanning circuit.

2. The method of claim 1, wherein the method further includes:

at the first scanning circuit, extracting signals which are representative of an intensity of photo-exposure of light-sensitive elements associated with red and blue spectral regions; and at the second scanning circuit, extracting signals which are representative of an intensity of photo-exposure of light-sensitive elements associated with green and white spectral regions.

3. A method of extracting data representative of photo-exposure intensity values from light-sensitive elements in an array of light-sensitive elements, the array having distinct first and second sets of rows of the light sensitive elements, each of the light-sensitive elements having a sensitivity to energy in one of a plurality of spectral regions and being associated with a corresponding spectral region, the extraction process occurring in first extraction intervals in which data is extracted from rows in the first set of rows and second extraction intervals in which data is extracted from rows in the second set of rows, the method comprising:

at a first scanning circuit, extracting signals representative of an intensity of photo-exposure of each light-sensitive element associated with a first spectral region during the first extraction intervals and extracting signals representative of an intensity of photo-exposure of each light-sensitive element associated with a second spectral region, at the second extraction intervals; and at a second scanning circuit, extracting signals representative of an intensity of photo-exposure of each light-sensitive element associated with a third spectral region, at the first extraction intervals, the third spectral region being distinct from the first and second spectral regions, and extracting signals representative of an intensity of photo-exposure of each light-sensitive element associated with a spectral region distinct from the first and second spectral regions at the second extraction intervals.

4. The method of claim 3, the method further comprising:

following each of the first extraction intervals, reading out data from the first scanning circuit which is representative of the intensity of photo-exposure of light sensitive elements associated with the first spectral region, and reading out data from the second scanning circuit which is representative of the intensity of photo-exposure of light sensitive elements associated with the third spectral region; and following each of the second extraction intervals, reading out data from the first scanning circuit which is representative of the intensity of photo-exposure of light sensitive elements associated with the second spectral region, and reading out data from the second scanning circuit which is representative of the intensity of photo-exposure of light sensitive elements associated with the third spectral region.

5. A system for extracting data from an array of light-sensitive elements, each of the light-sensitive elements having a sensitivity to energy in a corresponding one of a plurality of spectral regions and being associated with the corresponding spectral region, the system comprising:

a first scanning circuit for extracting signals representative of an intensity of photo-exposure of light sensitive elements associated with a first spectral region at a first set of extraction intervals, and extracting signals representative of an intensity of photo-exposure of light sensitive elements associated with a second spectral region at a second set of extraction intervals time multiplexed with the first set of extraction intervals, the second spectral region being distinct from the first spectral region; and a second scanning circuit for extracting signals representative of an intensity of photo-exposure of light sensitive elements associated with a third spectral region at the first set of extraction intervals, the third spectral region being distinct from the first and second spectral regions, and extracting signals representative of an intensity of photo-exposure of light sensitive elements associated with a spectral region which is distinct from the first and second spectral regions at the second set of extraction intervals.

6. In a camera for focusing light from an object onto an array of light sensitive-elements, each of the light-sensitive elements having a sensitivity to energy in a corresponding one of a plurality of spectral regions and being associated with the corresponding spectral region, the improvement including:

a first extraction circuit for extracting data representative of an intensity of photo-exposure of each of a plurality of the light-sensitive elements at the extraction intervals, the data extracted at any particular extraction interval originating from light-sensitive elements associated with a single spectral region which is one of a first and a second spectral region, the first and second spectral regions being distinct from one another; and a second extraction circuit for extracting data representative of an intensity of photo-exposure of each of a plurality of the light-sensitive elements at the extraction intervals, the data extracted at each extraction interval originating from light-sensitive elements associated with a third spectral region, the third spectral region being distinct from the first and second spectral regions, wherein a gain circuit applies a first uniform gain to extracted data representative of the intensity of photo-exposure of the light-sensitive elements associated with the first spectral region, a second uniform gain to extracted data representative of the intensity of photo-exposure of the light-sensitive elements associated with the second spectral region, and a third uniform gain to extracted data representative of the intensity of photo-exposure of the light-sensitive elements associated with the third spectral region.

7. The camera of claim 6, wherein the second extraction circuit extracts data representative of an intensity of photo-exposure of each of a plurality of the light-sensitive elements at the extraction intervals, the data extracted at any particular extraction interval originating from light-sensitive elements associated with a single spectral region which is either the third or a fourth spectral region, the fourth spectral region being distinct from the first, second and third spectral regions, and wherein the gain circuit applies a uniform gain to extracted data representative of the intensity of photo-exposure of the light-sensitive elements associated with the fourth spectral region.

8. A method of processing data from an array of light-sensitive elements which is representative of intensity of photo-exposure of light-sensitive elements, each of the light-sensitive elements having a sensitivity to energy in a corresponding one of a plurality of spectral regions and being associated with the corresponding spectral region, the method comprising:

extracting data at a first extraction circuit, representative of an intensity of photo-exposure of each of a plurality of the light-sensitive elements at the extraction intervals, the data extracted at any particular extraction interval originating from light-sensitive elements associated with a single spectral region which is either a first or a second spectral region, the first and second spectral regions being distinct from one another;

extracting data at a second extraction circuit, representative of an intensity of photo-exposure of each of a plurality of the light-sensitive elements at the extraction intervals, the data extracted at each extraction interval originating from light-sensitive elements associated with a third spectral region, the third spectral region being distinct from the first and second spectral regions; and applying a first uniform gain to extracted data representative of the intensity of photo-exposure of the light-sensitive elements associated with the first spectral region, a second uniform gain to extracted data representative of the intensity of photo-exposure of the light-sensitive elements associated with the second spectral region, and a third uniform gain to extracted data representative of the intensity of photo-exposure of the light-sensitive elements associated with the third spectral region.

9. A method of processing data from an array of light-sensitive elements which is representative of intensity of photo-exposure of light-sensitive elements, each of the light-sensitive elements having a sensitivity to energy in a corresponding one of a plurality of spectral regions and being associated with the corresponding spectral region, the method comprising:

extracting data at a first extraction circuit representative of an intensity of photo exposure of each of a plurality of the light-sensitive elements at the extraction intervals, the data extracted at any particular extraction interval originating from light-sensitive elements associated with a single spectral region which is one of a first and a second spectral region, the first and second spectral regions being distinct from one another; and extracting data at a second extraction circuit representative of an intensity of photo-exposure of each of a plurality of the light-sensitive elements at the extraction intervals, the data extracted at any particular extraction interval originating from light-sensitive elements associated with a single spectral region which is either a third or a fourth spectral region, the third spectral region being distinct from the first and second spectral regions, the fourth spectral region being distinct from the first, second and third spectral regions, and applying a first uniform gain to extracted data representative of the intensity of photo-exposure of the light-sensitive elements associated with the first spectral region, a second uniform gain to extracted data representative of the intensity of photo-exposure of the light-sensitive elements associated with the second spectral region, a third uniform gain to extracted data representative of the intensity of photo-exposure of the light-sensitive elements associated with the third spectral region, and a fourth uniform gain to extracted data representative of the intensity of photo-exposure of the light-sensitive elements associated with the fourth spectral region.

\* \* \* \* \*